April 29, 1952   F. PORTAIL   2,594,988
PRIMARY BATTERY AND CONSUMER
Filed Dec. 6, 1949
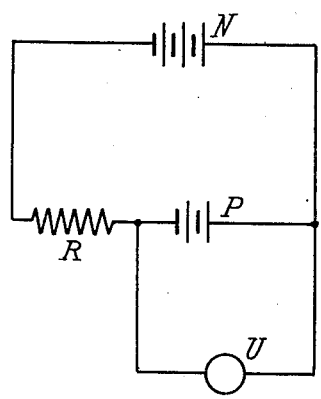
Inventor
Fernand Portail Patented Apr. 29, 1952

2,594,988

UNITED STATES PATENT OFFICE 2,594,988

PRIMARY BATTERY AND CONSUMER

Fernand Portail, Paris, France, assignor to Compagnie Industrielle des Piles Electriques C. I. P. E. L., Neuilly-sur-Seine, France, a corporation of France Application December 6, 1949, Serial No. 131,384
In France January 14, 1949

4 Claims. (Cl. 320—3)

The present invention relates to electric batteries, and more particularly to primary batteries. It is an object of this invention to provide a primary battery which is suitable to work with varying load.

It is another object of the present invention to provide a battery which gives a continuous current of small intensity and short-time peak currents of relatively high intensity.

It is a known drawback of certain primary batteries of great capacity, particularly of batteries with an alkaline electrolyte and a porous carbon cathode, that they supply economically only currents that are weak with respect to their capacity. For instance, a battery of this type with a capacity of 1,000 a. h. has an optimum range of discharge of 0.2 amp. and is unsuitable for a range which includes momentary loads exceeding 0.5 amp. On the other hand, the batteries which are derived from the Leclanche cell and have as essential element of the electrolyte a solution of sal ammoniac stand very well relatively high non-permanent outputs, for instance of several amps, the only condition being that they are not subjected to a continuous output even if it be small, for the latter has the effect of rapidly increasing the inner resistance.

In numerous cases of practical application, for instance in the current supply for automatic telephone central offices or in signalling devices for railroads, the load is variable and consists of a relatively weak continuous output in combination with current peaks which can reach several amperes.

It is an object of the present invention to provide primary batteries which allow to meet the conditions pointed out heretofore.

According to the invention, the primary battery comprises a battery, preferably including a plurality of cells, having an alkaline electrolyte, and a battery, preferably including a plurality of cells, having an electrolyte containing sal ammoniac, the battery having an alkaline electrolyte being connected in parallel to the battery having an electrolyte containing sail ammoniac. In this combination, the battery with an alkaline electrolyte supplies the continuous load and the battery with an electrolyte containing sal ammoniac supplies the peaks of the current.

The combination according to the present invention allows to use fully the capacity of the cells with alkaline electrolyte without the transient higher loads having the effect to put these cells prematurely out of service as it would be the case if these cells were utilized alone.

The two batteries having an alkaline electrolyte and an electrolyte containing sal ammoniac are preferably so arranged that the E. M. F. of the alkaline battery is higher than that of the battery with sal ammoniac, but without reaching a value which would lead to a damaging or a destruction of the latter battery.

In reducing the present invention to practice, it has been found advantageous to provide an electrical resistance between the alkaline battery, hereinafter called the supplying battery at continuous output, and the battery with sal ammoniac, hereinafter called the peak battery, the load circuit being connected to the terminals of the peak battery. Under these conditions, and provided that the resistance is correctly chosen, the surprising fact has been discovered that the useful capacity supplied by the two batteries at peak loads surpasses very largely the useful capacity of the peak battery.

The combination, therefore, according to the invention behaves as if the peak battery acted as a condenser of a very large capacity or as a secondary battery, and not exclusively as a generator.

In order to obtain this result, two conditions have to be fulfilled:

First, the two batteries and the resistance inserted in the circuit must be so chosen that the voltage applied to the terminals of the peak battery is never dangerous for the latter. It has been found that a voltage of two volts per cell with sal ammoniac had no pernicious consequences on the battery.

Secondly, the resistance must be so chosen that even the highest load the current which the supplying battery at continuous output has to supply does not exceed the normal value of discharge.

In the accompanying drawing, a circuit diagram of a primary battery according to the present invention is shown by way of example.

In the drawing, N is the supplying battery at continuous output consisting of a plurality of cells having an alkaline electrolyte for instance cells described in the U. S. A. Patent No. 2,118,712, with soda as electrolyte. P is the peak battery consisting of a plurality of cells having an electrolyte containing sal ammoniac for instance, cells of the well known Leclanche type, R is a resistance, and U is a load circuit. The batteries N and P are connected with like terminals to each other, and the other two like terminals are connected with the resistance R being inserted between the two batteries. The load circuit U is connected to the terminals of the peak battery P. Therefore, the supplying battery N and the resistance R are connected in series so as to form a unit, and this unit, the peak battery P and the load circuit U, are connected in parallel to one another.

If it is now supposed that the load circuit U has a permanent load of 0.02 amp. and a transient load of 1.5 amp. during three minutes per hour at 3 volts, the supply battery N at continuous output may consist of three cells having an alkaline electrolyte with an E. M. F. of 1.4 volts each and a useful capacity of 1,000 a. h. The peak battery P consists of two cells having an electrolyte containing sal ammoniac with an E. M. F. of 1.6 volts each and a capacity of at least 100 a. h. The resistance R, which is inserted between the two batteries, amounts to 5 ohms.

When the apparatus is started at a load of 0.02 amp., it has been found that the voltages of the two batteries are, respectively, four volts for the supplying battery N and 3.2 volts for the peak battery P. The voltage of the peak battery P increases progressively to 3.8 volts, whereas the voltage of the supplying battery N decreases to 3.9 volts. When the maximum load of 1.5 amp. is applied, the voltage of the peak battery P decreases to 3 volts and the voltage of the supplying battery N decreases to 3.7 volts. When the load returns to 0.02 amp., the equilibrium is slowly reestablished at 3.8 volts for the peak battery and 3.9 volts for the supplying battery.

Under the conditions described hereabove, the daily consumption of the installation is about 2,256 a. h. of which 1.8 a. h. are used at 1.5 amp. The battery lasts about 400 days, i. e. it supplies practically the useful capacity of the supplying battery N.

It will be understood that each of the elements described above, or two or more together, may also find a useful application in other types of primary batteries, differing from the types described above.

While I have illustrated and described the invention as embodied in primary batteries, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. In combination: a battery having an alkaline electrolyte; a resistance connected in series to said battery having an alkaline electrolyte; a battery having an electrolyte containing sal ammoniac; and a consumer of electrical energy; the series connection of said battery having an alkaline electrolyte and said resistance, said battery having an electrolyte containing sal ammoniac, and said consumer being connected in parallel to one another, whereby said battery having an alkaline electrolyte supplies a continuous output current to said consumer, whereas the battery having an electrolyte containing sal ammoniac supplies any peak currents to said consumer.

2. In combination: a battery having an alkaline electrolyte; a resistance connected in series to said battery having an alkaline electrolyte; a battery having an electrolyte containing sal ammoniac; and a consumer of electrical energy; the series connection of said battery having an alkaline electrolyte and said resistance, said battery having an electrolyte containing sal ammoniac, and said consumer being connected in parallel to one another; said battery having an alkaline electrolyte having an E. M. F. being in excess of the E. M. F. of said battery having an electrolyte containing sal ammoniac, whereby said battery having an alkaline electrolyte supplies a continuous output current to said consumer, whereas the battery having an electrolyte containing sal ammoniac supplies any peak currents to said consumer.

3. In combination: a plurality of cells having an alkaline electrolyte and being connected in series to one another; a resistance connected in series to said series-connected cells having an alkaline electrolyte; a plurality of cells having an electrolyte containing sal ammoniac and being connected in series to one another; and a consumer of electrical energy; the series connection of said series-connected cells having an alkaline electrolyte and said resistance, said series-connected cells having an electrolyte containing sal ammoniac, and said consumer being connected in parallel to one another, whereby said series-connected cells having an alkaline electrolyte supply a continuous output current to said consumer, whereas said series-connected cells having an electrolyte containing sal ammoniac supply any peak currents to said consumer.

4. In combination: three cells having an alkaline electrolyte and an E. M. F. of 1.4 volts each; a resistance of approximately 5 ohms connected in series to said three cells having an alkaline electrolyte; two cells having an electrolyte containing sal ammoniac and an E. M. F. of 1.6 volts each; and a consumer of electrical energy taking a continuous load of about 0.02 amp. and a peak load of 1.5 amp. at 3 minutes per hour; the series connection of said three cells having an alkaline electrolyte and said resistance, said two cells having an electrolyte containing sal ammoniac, and said consumer being connected in parallel to one another.

FERNAND PORTAIL.

REFERENCES CITED

The following references are of record in the file of this patent:

UNITED STATES PATENTS

| Number | Name | Date |
|---|---|---|
| 979,154 | Gugler | Dec. 20, 1910 |
| 1,846,246 | Bowditch | Feb. 23, 1932 |
| 2,000,571 | Oswald | May 7, 1935 |
| 2,118,712 | Oppenheim | May 24, 1938 |
| 2,369,033 | Eubank | Feb. 6, 1945 |

FOREIGN PATENTS

| Number | Country | Date |
|---|---|---|
| 722,761 | France | Jan. 5, 1932 |